United States Patent [19]

Talbert

[11] 4,137,759

[45] Feb. 6, 1979

[54] BELT TENSION INDICATING APPARATUS

[76] Inventor: Wayne M. Talbert, 11432 Cold Spring, Houston, Tex. 77043

[21] Appl. No.: 854,507

[22] Filed: Nov. 25, 1977

[51] Int. Cl.² .............................................. G01L 5/06
[52] U.S. Cl. .................................... 73/143; 33/148 D
[58] Field of Search ................... 73/95, 95.5, 142–144; 33/147 D, 148 D, 148 R

[56] References Cited

U.S. PATENT DOCUMENTS

| | | | |
|---|---|---|---|
| 941,359 | 11/1909 | Cowen | 33/147 D X |
| 1,569,352 | 1/1926 | Brace | 33/147 D |
| 3,492,731 | 2/1970 | Diehl | 33/148 D |
| 3,864,953 | 2/1975 | Fletcher et al. | 73/143 |

FOREIGN PATENT DOCUMENTS 289203  4/1928  United Kingdom .................. 33/148 D

*Primary Examiner*—James J. Gill
*Attorney, Agent, or Firm*—Donald Gunn

[57] ABSTRACT

An apparatus is disclosed for measuring the tension in a belt. The preferred embodiment incorporates a housing which is adapted to be momentarily attached to a belt. As the belt tension is varied, the device indicates the change in tension. This is achieved by incorporating a roller which contacts the belt, the roller supporting a pointer or needle which gives a reading by its movement adjacent to a scale on a housing. The housing is held secure to the belt by a clamping means contacting one edge against the belt. The housing is additionally supported against the belt by the roller which is supported on a shaft in the housing. The roller thus rotates on elongation, and the needle deflects.

14 Claims, 8 Drawing Figures

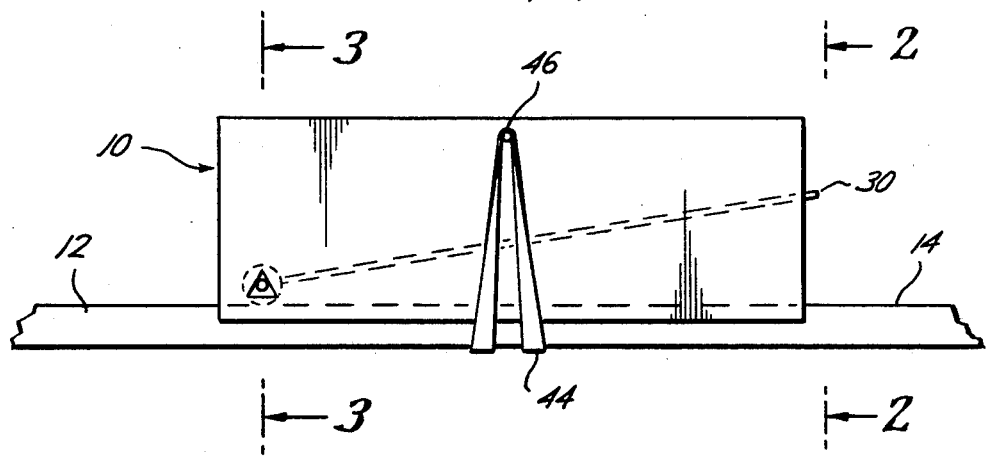
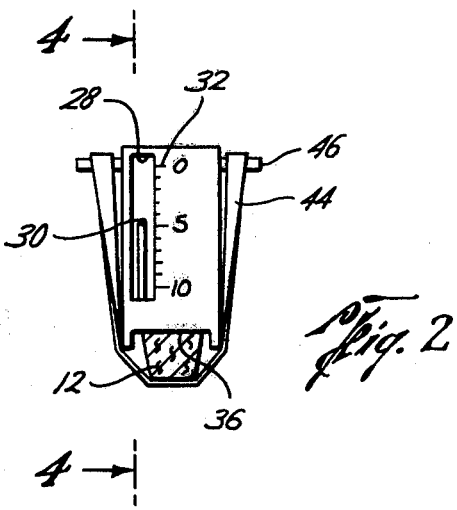
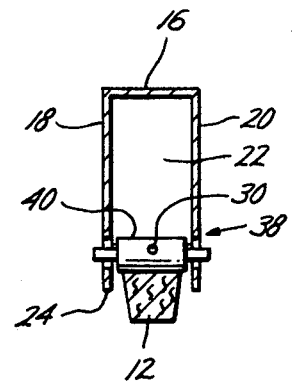
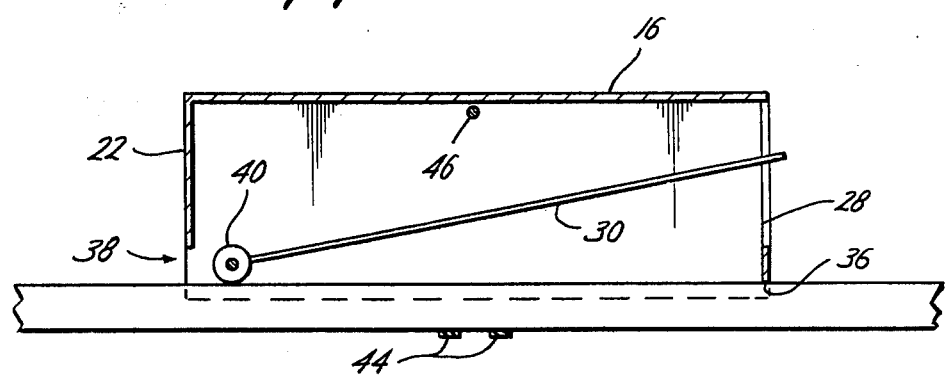

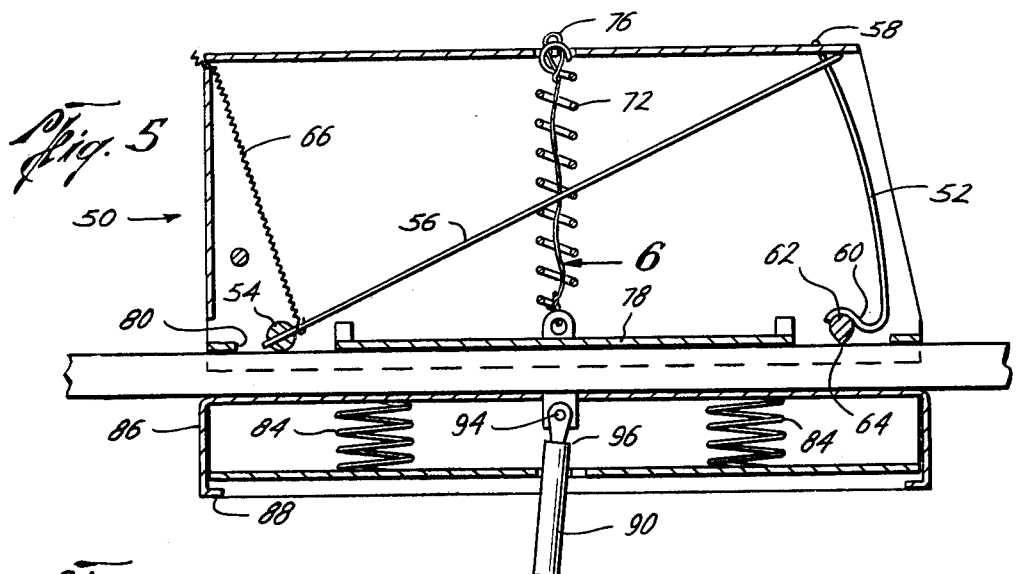
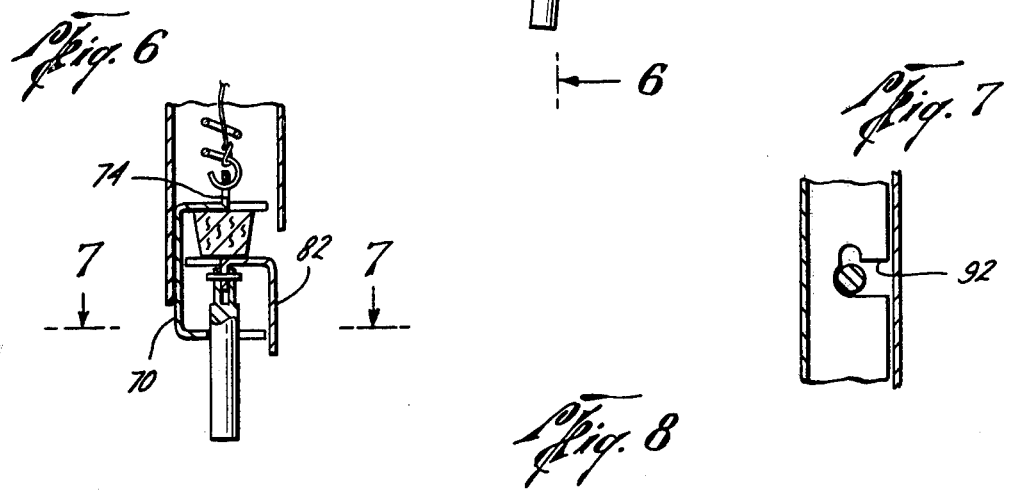
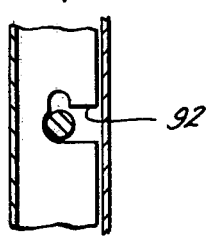
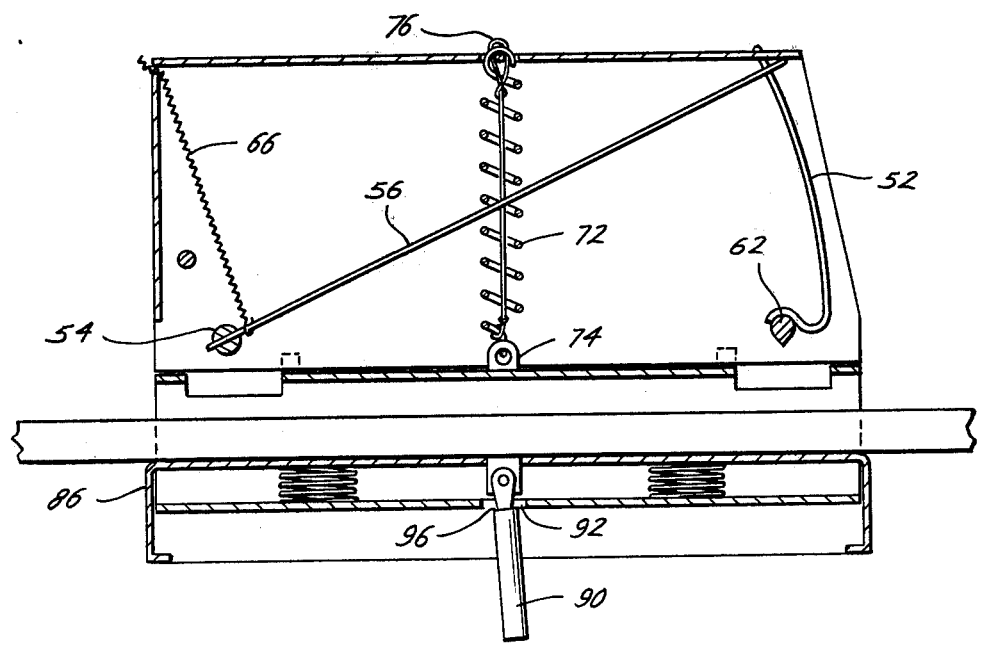

BELT TENSION INDICATING APPARATUS

BACKGROUND OF THE DISCLOSURE

In the servicing of automobiles and other machinery, it is always a difficult task to properly tension flexible vee and flat drive belts. Flexible belts are very common in machinery, particularly automobiles. They are popular because they are a low cost, compact means for transferring power from a power source to a driven instrument by a pulley system. Flexible belt drive systems can accommodate variations in placement, slight angular misalignment, etc. Moreover, they are quite easy to install.

It is, however, necessary to check the tension in a flexible belt drive system from time to time. Some develop a feel for belt tension testing. However, testing the tension of the belt by hand touch or the like is believed to be difficult to all except experienced mechanics. Moreover, it is not precise in the sense that it merely gives a feel for the rightness of the tension.

The present invention is used to achieve the correct tension when tightening a belt. As an example, belt tensioning is routinely necessary in automobile service work due to relaxation of belts. If there is inadequate tension, the engine which serves as the prime mover for the belt system will not adequately power the accessories which are driven by the belt system. Belt slippage may occur and thereby damage the belt. Belt slippage tends to heat the surface of the belt, placing a glossy, brittle face on the rubber and thereby preventing realization of the full life of the belt. Failure of the bearings in the driven accessories occurs if belts are tightened excessively.

The present invention is a handy device to use. It is able to detect changes in belt tension and, more importantly, will give a quantitative reading. The quantitative reading enables the user of the present invention to adjust the belt to a specified tension by observing the reading on the meter.

The present invention is a relatively inexpensive device to manufacture. Notwithstanding the low cost of manufacture, it is a device which can, with a reasonable degree of accuracy, provide an indication of belt tensioning. Other belt tensioners commercially available do not give continuous readings and require manual operation each time a reading is taken. This results in a trial and error procedure of tightening the belt and getting a reading. Few automobile mechanics routinely use them because of time required in use and high purchase price.

BRIEF DESCRIPTION OF THE DISCLOSED EMBODIMENT

The disclosed and illustrated embodiment is a belt tensioning indicator. It incorporates a generally rectangular housing having two points of contact for a belt. One point of contact is a fixed end attached to the wall in the housing. The other point of contact is at the opposite end of the housing, and it is a roller supported on a transverse shaft through the housing. The roller is contacted against the face of the belt. The housing is held to the belt by means of a suitable elastic clamp mechanism or spring loaded clamp. The roller is rotated as the belt elongates when it is tensioned. The movement of the indicator needle attached to the roller is directly proportional to the elongation of the belt. The tension in a belt is related to its elongation, and a scale is provided on the tensioner device which reads units of force. An alternate arrangement is to provide a scale that reads in units of elongation. A chart or scale conversion converts elongation readings into force units for any given belt size.

BRIEF DESCRIPTION OF THE DRAWINGS

FIG. 1 discloses the belt tensioning indicator of the present invention installed on a flexible belt;

FIG. 2 is a sectional view along the line 2—2 of FIG. 1 showing the end thereof and a calibrated, visible indicator;

FIG. 3 is a sectional view along the line 3—3 showing the roller which rotates the indicator shown in FIG. 2;

FIG. 4 is a sectional view along the line 4—4 showing the roller and indicator needle;

FIG. 5 is a sectional view through an alternate embodiment which is suitable for commercialization;

FIG. 6 is a sectional view along the line 6—6 of FIG. 5 showing details of construction of a clamp mechanism;

FIG. 7 is a sectional view along the line 7—7 of FIG. 6 showing a latch mechanism temporarily holding the clamp mechanism; and FIG. 8 is a view similar to FIG. 5 showing the clamp mechanism depressed.

DETAILED DESCRIPTION OF THE ILLUSTRATED EMBODIMENT

In the drawings, the belt tension indicating apparatus is identified by the numeral 10. It is placed on a flexible belt 12 to indicate its tension. The flexible belt 12 is of typical construction, formed of a rubber and cord material and having what is identified as the outer face 14. The belt is typically trapezoidal and cross sectioned as shown in the drawings. The belt, being made of rubber and cord materials, is able to be stretched to thereby vary its tension. If the tension is too tight, the belt may be damaged. If it is too loose, it will not correctly transfer power and will wear out rapidly. This invention responds to belt tension to measure it.

The belt tension indicator apparatus incorporates a generally rectangular sheet metal housing. It has a top wall 16 and similar sidewalls 18 and 20. It includes an end wall 22. The end wall does not extend to the bottom edge 24 of the sidewall. The end wall does not contact the top face 14 of the belt 12.

The opposite end of the housing incorporates an end wall 26. It has a slot 28 cut into it. The slot 28 permits an indicator needle 30 to extend through the slot. The needle is permitted to rotate and thus deflect through the length of the slot 28. For this reason, the slot has calibrations 32 immediately adjacent to it so that needle movement is converted into scale units. Arbitrary units are shown in the drawings. For a given type and size of belt, scale units can be provided that read in units of force. An alternative is to use units of elongation such as inches of stretch per inch of belt. A chart for specific belts which converts units of elongation to units of force can easily be calculated for any given belt.

The end wall 26 defines a bottom edge 36. The bottom edge 36 is formed in the sheet metal material to define a sharp transverse edge. It is contacted against the face 14 of the belt and supports the housing against it. It is not sharp in the sense that a knife is sharp. However, it is made of relatively thin sheet metal and is sharp in the sense that once contacted against the face 14, it is not easily moved by sliding along the belt 12.

The edge 36 thus serves as a fixed point to locate the housing on the belt. More importantly, this fixed point is a reference, so to speak, which permits a tension measure or indication to be obtained. Sheet metal is the preferred material, although other materials can be used.

As shown in FIG. 4 of the drawings, the housing contacts the belt 12 at the edge 36. This is a fixed support for the housing. The housing additionally supports a roller 40 on a triangular bearing assembly 38. The roller 40 is located lower in the housing than the end wall 22 and, accordingly, serves as a second point of contact for the housing. It will be observed in FIG. 4 of the drawings that the housing is rested on the belt 12 between the two points of contact. The housing is supported generally upright relative to the face 14 because the face 14 defines the support surface. The support surface extends across the belt and contacts the edge 36 and the roller 40 in line contact. This holds the housing erect relative to the belt with the sidewalls 18 and 20 hanging down over the sides of the belt.

It will be observed that the device can accomodate a range of belt widths. The measuring indicator is thus adaptable for use with belts of a specified range of sizes. If larger belts are to be measured, the housing is readily manufactured with greater width. It is believed that two or three models of the present invention will suffice for measuring vee belts of practically all sizes.

The roller 40 is free to rotate on the triangular bearing 38. It does not bind against the sidewalls 18 and 20. More importantly, its rotation is determined by movement of the belt. The bearing 38 is free of clearance and is a feature reducing hysteresis. To this end, the housing is clamped against the belt so that the roller 40 rotates only with elongation of the belt 12. Clamping can be achieved in several ways. As an example, an elastic band 44 can be used to affix the housing to the belt. The housing incorporates a post 46 which extends through both walls and which protrudes on the outside of the housing. The post 46 is sufficiently long to enable the rubber band 44 to be looped over both ends of it and around the housing. It serves as a clamp means to secure the housing to the belt 12 as depicted in FIG. 2 of the drawings. It is easily placed on the belt, and this also enables easy removal.

The elastic band 44 thus is a quick release attachment mechanism. It is not required that it clamp the belt rigidly or tightly. It does not have to hold the belt so tightly that it significantly deflects or bends the belt. It is primarily a temporary attachment mechanism for holding the housing onto the belt.

The roller 40 supports the indicator needle 30. It forms an indication of belt tension change in the following manner. When the device is installed on the belt, the housing is placed on the top side of the belt. The needle is manually positioned to the zero mark at the indications 32. This is the beginning condition of the indicator 10. The elastic band is also looped around and quickly attached to the post 46 to anchor the housing. Thereafter, the user of the present invention applies some tension to the belt. As tension is applied, the belt elongates. A certain incremental stretch occurs within the housing. Of particular interest is the stretch which occurs between the point of contact at 36 and the roller 40. The point 36, being a relatively sharp edge, does not slide or skid on the belt 12. Rather, it holds firmly to the belt and thereby anchors the housing. The housing is held stationary by its contact at the edge 36. This is not so for the roller 40. The roller is clamped against the belt to frictionally engage it, but it is free to rotate and thereby permits the belt to elongate between the edge 36 and the roller 40.

Consider for the moment a change in tension of the belt. The change in tension is accompanied by an incremental change in belt length. In particular, the change in tension is reflected as a change in belt length sensed by the present invention. The particular segment of belt between the points 36 and 40 is varied with the change in tension. This variation causes the roller 40 to rotate around the support shaft that it is mounted on. When the roller 40 rotates, its rotation is imparted to the indicator needle 30. Even if the roller rotates only through a slight angle, such as one or two degrees, the indicator needle 30 is notably deflected. The indicator needle has a length such that the small, angular rotation of the roller 40 is magnified and amplified for ease of interpretation. Thus, the incremental rotational movement of the roller 40 deflects the needle 30 by a significant sweep. A tension indicator has been tested, and it was found that with a three-sixteenths inch (3/16") diameter roller and a four inch (4") needle, needle travel of one inch (1") is readily attained when tightening an automotive vee belt. Beginning with a slack belt, the user merely tightens the belt until the desired reading is obtained on the indications 32. After the belt is placed at the correct tension utilizing the indicator of the present invention, the housing is removed. Removal is quite easy. The elastic band 44 is simply quickly disengaged from the post 46, and the housing is removed. On the next use, the device is installed in the same manner and read in the same manner.

The present invention is particularly useful for automobile mechanics. Moreover, it can be used in a horizontal position, but it also can be placed on a belt where it is at any other angular position. It can even be used where belt access is very limited as, for instance, where it must be placed on the bottom side of a belt. The clamp must be firm enough to prevent the roller from being rotated by the gravity pull. To this end, the roller 40 is preferably made to a specified diameter with knurling on its exterior surface to frictionally prevent slippage or unintended rotation of the roller 40.

Attention is next directed to FIG. 5 of the drawings. An alternate embodiment is indicated in FIG. 5 by the numeral 50. The embodiment 50 is quite suitable for commercial distribution of the present invention. It is similar to the embodiment 10 shown in FIG. 1, except that certain modified and additional components are included. These enhance its operation, but the device 50 still operates in accordance with the same principles set forth for the embodiment 10.

The commercial version 50 thus incorporates the same housing. The end wall 52 is curved, and it has a radius of curvature which approximately coincides with the roller 54. The roller 54 functions in the same manner as the roller 40 previously mentioned. The needle 56 functions in the same manner as the needle 30 in the first embodiment.

The housing is of similar construction, except the end wall 52 is curved for the reason mentioned. Curvature of the end of face 52 avoids distortion as the angular movement of the needle 56 is converted into a numeric scale reading. As a manufacturing convenience, the end wall is thus formed out of a single piece of stock having a protruding tab 58 which punches through a small opening formed in the top wall, and it further includes an S-shaped curved portion 60 at the lower end. This enables it to hook over a transverse mounting post 62. The post 62 is transverse of the housing and holds opposite sidewalls together. It lends structural rigidity. In addition, it supports and carries a lower edge 64. The edge 64 is the fairly sharp housing edge corresponding to the edge 36 previously discussed and described. It serves as an anchor point to prevent the housing from skidding on the belt.

A return spring or elastic band 66 is looped around the needle 56 and is anchored at a convenient location in the housing. It has sufficient pull on the needle to return it to zero. The curved end face 52 has a slot in it with a numeric scale printed on it, and zero is located at the upper end of the slot, the resilient means 66 serving as a return mechanism.

The upper parts of the housing shown in FIG. 5 are stationary. A clamp mechanism aligns and captures the belt. The clamp mechanism is in the lower parts of the housing. To this end, a generally U-shaped channel portion 70 is caught between the two main walls of the housing. It is pulled upwardly by a coil spring 72 shown in FIG. 5. The U-shaped channel means 70 is equipped with a top located tab 74 in FIG. 6 which engages the coil spring 72. The coil spring 72 extends downwardly by a limited amount; overextension is prevented by a flexible cable 76 having a fixed length. This limits the extension of the spring 72 and the downward movement of the U-shaped channel 70.

The channel 70 is open at one face or side, and this permits the belt to be positioned in it as shown in FIG. 6. It thus serves as an alignment tool for the top face of the belt. In FIG. 5, the U-shaped channel is shown with a continuous upper face 78 interrupted at a gap portion 80. The gap 80 is matched at the opposite end. The gap 80 is arranged so that the channel can ride up and thereby expose the rotatable roller 54. At the opposite end, another gap is incorporated so that the edge 64, which is a reference for aligning the housing against the belt, is also exposed. Thus, when the channel 70 is down, the two are shielded by it, while it may ride upwardly under urging of the spring 72 and thereby expose them for contact against the belt.

The spring 72 pulls it upwardly and thus permits the belt to be contacted by the two members, namely the fixed reference and the rotatable roller 54.

An L-shaped channel 82, better shown in FIG. 6, is nested in the U-shaped channel 70. The two are parallel to one another. The channel 82 has an upper face which clamps against the belt. As shown in FIG. 5, the channel 82 is forced upwardly by suitable parallel coil springs 84 arranged at opposite ends of the clamp means. The coil springs are compressed and thereby force the channel 82 upwardly to pinch the belt. The belt is thus caught between two metal faces which are parallel to one another. This straightens and aligns the belt. In effect, the belt is clamped between approximately parallel metal surfaces and is, therefore, straightened, all for the purpose of preventing belt sag. Depending on the weight of the belt, the tension in it, the age of the belt and many other factors, belt sag between the roller 54 and the reference edge 64 can create potential errors in measurement. With the alignment clamp mechanism shown in the drawings, such errors are prevented. To this end, the L-shaped channel 82 is thus forced upwardly.

The channel member 82 includes end walls at 86 which capture the U-shaped channel 70. The end walls are spaced apart and have underhanging tabs 88. This keeps the two channel-shaped members together for the purpose of continued alignment.

The clamp mechanism can be locked open or closed. A lever 90 extending through an L-shaped slot 92 (see FIG. 7) is joined to the nether side of the L-shaped channel 82. It is attached by means of a clevis mechanism 94 to permit the lever to pivot. The lever has an upwardly facing shoulder 96 which catches in the L-shaped slot 92 to lock it down and thereby compress the springs 84. This opens the clamp mechanism to insert the belt. FIG. 8 shows the lock position achieved with the lever 90, thereby opening the clamp mechanism to receive the belt. Substantial clearance is achieved. This permits the embodiment 50 to be clamped on belts of varying heights and widths. The adjustable parts which move in the clamp mechanism thus accommodate variations in size of belts. The arrangement of the parts in FIG. 8 thus demonstrates how the clamp mechanism is first aligned. It is positioned adjacent to the belt, not touching the roller 54 at this time. The lever 50 is released by easy thumb manipulation. It is simply flicked to the side, and this permits the coil springs 84 to force the L-shaped channel 82 upwardly. When they move upwardly, they also jam the belt against the overhanging top wall 78. This captures the belt between the two parallel clamp members and thereby keeps it straight. The coil spring 72 pulls the entire clamp mechanism upwardly until the roller 54 presses through the gap 80 and touches the top face of the belt. Simultaneously, the reference edge 64 touches the belt at the other end. This then aligns the belt, prevents sag, and, as tension stretches the belt, the needle is deflected.

Operation of the embodiment 50 is believed to be readily understood from the description of the previous embodiment. It enhances the embodiment 10 by including the automatic zero mechanism achieved through the resilient member 66. It also is enhanced over the embodiment 10 by incorporation of the clamp means.

The foregoing is directed to the preferred embodiment, but the scope is determined by the claims which follow.

I claim:

1. Apparatus for indicating a change in tension in a belt which comprises:
    (a) a roller means;
    (b) an indicator needle means connected to said roller and rotated thereby;
    (c) housing means which supports said roller for rotation by contact with a belt, said housing means further adapted to be fixedly, temporarily positioned against a belt by a relatively fixed means supported thereby such that elongation of the belt relatively rotates said roller with respect to said housing and said fixed means;
    (d) belt straightening means for clamping a belt to straighten such belt; and
    (e) means positioning said belt straightening means adjacent to said housing means to position the straightened belt against said roller means and said fixed means.

2. The apparatus of claim 1 wherein said housing means is a generally rectangular housing and incorporates an edge which comprises said fixed means and which contacts said belt as a chosen belt location without skidding.

3. The apparatus of claim 2 wherein said housing includes parallel sides joined to said edge and a calibration scale thereon adjacent to said indicator needle.

4. The apparatus of claim 3 wherein said housing includes a slot in one end of said housing and wherein said needle means extends therethrough, and said calibration scale is adjacent to said slot.

5. The apparatus of claim 4 wherein said roller means and said edge are parallel to one another, and said roller means is on a shaft supported by said housing at a location such that said roller means and edge are spaced from one another by a length less than the length of said needle means.

6. The apparatus of claim 1 including clamp means for securing said housing means against a belt such that said roller means is contacted against the belt, and the belt, during tensioning, is stretched to rotate said roller means.

7. The apparatus of claim 6 including an edge which comprises said fixed means and which is on said housing means to contact said belt without skidding.

8. The apparatus of claim 7 wherein said edge is spaced from said roller means to define two points of contact against the belt separated by a specified distance.

9. The apparatus of claim 8 wherein said housing means comprises an enclosing housing about said roller means and said needle means.

10. The apparatus of claim 1 including a resilient means acting on roller means or said needle means for returning said needle means toward a minimum indication.

11. The apparatus of claim 1 wherein said housing comprises a facing side adapted to be presented to such a belt and further wherein said belt straightening means includes a movable member parallel to said facing side and a resilient means urging said movable member toward a clamping position.

12. The apparatus of claim 11 wherein said facing side is, in cross section, a planar member, and said movable member is, in cross section, an L-shaped parallel member.

13. The apparatus of claim 1 wherein:
  (a) said housing has a lengthwise edge of specified width with a width contacting a part of a belt;
  (b) said belt straightening means has a floating parallel edge of specified width; and
  (c) said positioning means comprises a resilient spring means urging said floating parallel edge toward said lengthwise edge.

14. For use with a belt tension measuring apparatus which measuring apparatus utilizes a means for measuring tension of the belt and which apparatus further includes a housing for the measuring means, the improvement which comprises belt straightening means for straightening such a belt wherein said belt straightening means comprises a relatively elongate and relatively fixed straight member and a movable means which means clamps such a belt between said movable means and said straight member, and means for positioning said belt straightening means adjacent to said housing to thereby position the straightened belt portion in operative proximity for measurement of belt tension by the measuring means.

* * * * *